United States Patent

Nyman et al.

[11] Patent Number: 6,132,615
[45] Date of Patent: Oct. 17, 2000

[54] METHOD AND APPARATUS FOR CREATING CONTROLLED FLOWS IN TWO MUTUALLY SEPARABLE SOLUTIONS

[75] Inventors: Bror Nyman, Vanha-Ulvila; Launo Lilja; Stig-Erik Hultholm, both of Pori; Juhani Lyyra; Raimo Kuusisto, both of Espoo; Petri Taipale, Vantaa, all of Finland; Timo Saarenpää, Santiago, Chile

[73] Assignee: Outokumpu Technology OYJ, Finland

[21] Appl. No.: 09/171,598

[22] PCT Filed: Apr. 29, 1997

[86] PCT No.: PCT/FI97/00251

§ 371 Date: Mar. 4, 1999

§ 102(e) Date: Mar. 4, 1999

[87] PCT Pub. No.: WO97/40899

PCT Pub. Date: Nov. 6, 1997

[30] Foreign Application Priority Data

Apr. 30, 1996 [FI] Finland ................................... 961830

[51] Int. Cl.[7] .......................... B01D 11/04; B01D 17/028
[52] U.S. Cl. .......................... 210/634; 210/800; 210/511; 210/513; 210/801
[58] Field of Search ..................................... 210/634, 511, 210/799, 800, 801, 802, 805, 521, 522, 513

[56] References Cited

U.S. PATENT DOCUMENTS

| | | | |
|---|---|---|---|
| 2,308,755 | 1/1943 | Stratfrd | 210/511 |
| 2,799,645 | 7/1957 | Musgrove | 210/511 |
| 3,752,758 | 8/1973 | Hindi et al. | 210/511 |
| 4,338,285 | 7/1982 | Eberts | 210/511 |
| 4,747,948 | 5/1988 | North | 210/511 |
| 4,954,260 | 9/1990 | Ludmer et al. | 210/511 |
| 5,185,081 | 2/1993 | Nyman et al. | 210/511 |

Primary Examiner—Robert J. Popovics
Attorney, Agent, or Firm—Morgan & Finnegan, L.L.P.

[57] ABSTRACT

The invention relates to a method for settling the dispersion formed in the mixing unit of liquid-liquid extraction, for controlling solution flows and for creating pure solutions in the separation part. According to the method, the flow speed of the organic solution phase is adjusted to be clearly higher than the flow speed of the aqueous solution phase, in which case in order to prevent border flow turbulence caused by the speed difference of the solution phases, the water drop dispersion layer left in between the separating solutions is adjusted to extend as far as the discharge end of the separation part. In order to settle the solution phases, at the front end of the separation part there are arranged at least three spots where the dispersion and the already settled solutions are made to flow through a picket fence forming a restricted transversal surface, in which case the first restricted transversal surface turns the flow fed into the separation part to follow the longitudinal direction of the separation part, and the second picket fence in the flow direction forming a restricted transversal surface allows the settled aqueous solution phase to flow freely in the bottom part of the separation part. The invention also relates to an extraction apparatus according to the method.

5 Claims, 4 Drawing Sheets

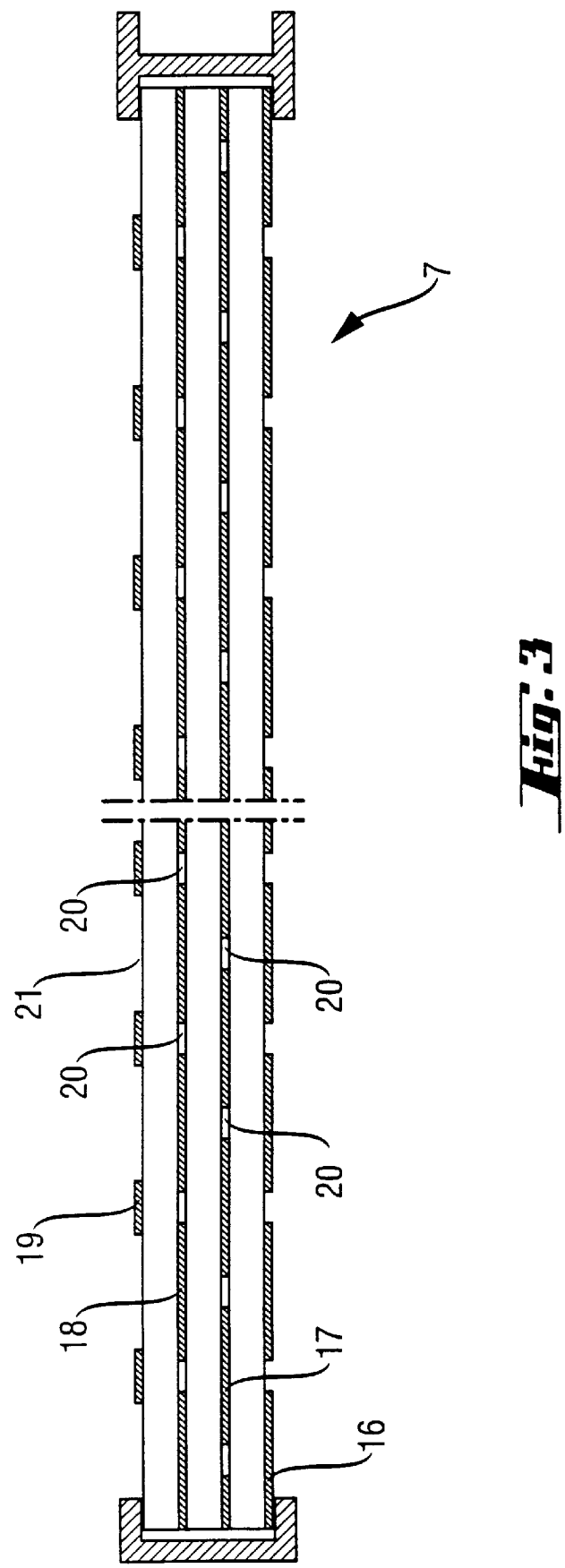

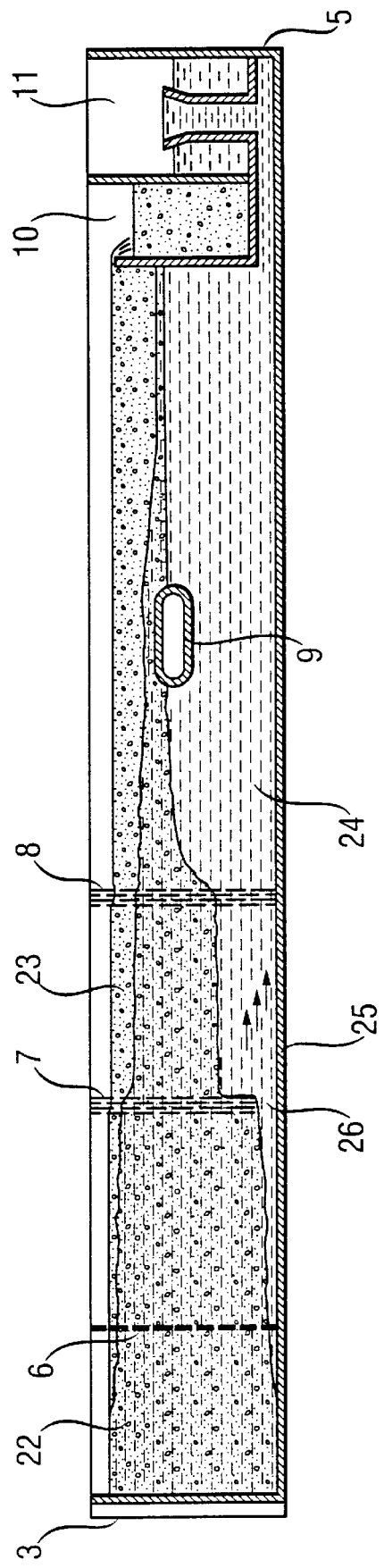

METHOD AND APPARATUS FOR CREATING CONTROLLED FLOWS IN TWO MUTUALLY SEPARABLE SOLUTIONS

FIELD OF THE INVENTION

The present invention relates to a method for controlling solution flows in liquid-liquid extraction in a space where two mutually mixed solutions proceed and simultaneously separate into two layers owing to the effect of gravity. The invention also relates to a settler for realizing the method, in which case the depth and flow baffle structures of the settler are designed so that the flow speed of the organic solution is adjustable to be clearly higher than the flow speed of the aqueous solution, but the phases can still be separated as pure, without the entrainment of the other solution rising to a disturbing level.

By means of the method and apparatus of the invention, the mutually separable solutions are made to proceed at an even speed both in transversal and vertical directions in circumstances provided for the separation, where an essential requirement is that the solutions are made to proceed in the fashion of a plug flow, from the front end of the separation tank to the final end thereof. Another purpose of the invention is to speed up the separation of the solutions and to improve the final degree of separation, i.e. to decrease the entrainment of both solutions in the other solution. It is typical of the method and apparatus of the invention that they retain the solutions from flowing directly forwards, so that in the front end of the separation tank, there are arranged several narrow flow spots provided with direction changes. The method and apparatus according to the invention are particularly well suited to very large copper extraction plants.

BACKGROUND OF THE INVENTION

In copper extraction, where the employed extraction solution is for instance hydroxyoxime dissolved into kerosene, it has been proved that the linear flow speed of the organic solution must not surpass the speed of 45–60 mm/s. In other cases the volume of entrainment, i.e. the amount of small water drops left in the extraction solution, begins to grow to a disturbing extent, even to the order of 1000 ppm, when a conventional separation method in a simple settler is applied. The linear speed can be decreased only to a limited extent by increasing the layer volume of the organic solution, because when the layer volume is increased, there is respectively needed more of the expensive organic reagent. This problem is generally solved so that there is used a 250–350 mm thick layer of organic solution, and the linear speed of the extraction solution is reduced by adding the width of the flow field of the separable solutions. Nowadays the width of the employed settler may be as large as its length, even larger. When the total volume of the solution flow is about 2,000 $m^3$/h, the settler width is of the order 25 m and its area 600–800 $m^2$.

The Finnish patent application 93 5393 introduces a method and apparatus whereby the pumping and mixing units in extraction plants can be improved, so that the previous maximum flow can be increased to be even 2.5-fold. In addition to pumping and mixing, said method and apparatus also relate to conducting the dispersion flow from the mixer into the settler, to the shape of the adjusting gate and picket fence arranged at the front end of the settler, as well as to the separation of organic solution at the final end of the settler.

According to a prevailing notion, the linear speed difference between the extraction solution and the aqueous solution must be small in order to avoid a remixing of the solutions owing to boundary surface turbulence and a resulting increase in the entrainment levels. As a solution for this problem, there are used low separation tanks, where the aqueous solution layer is not essentially thicker than the extraction solution layer. For instance in traditional copper extraction, the employed thickness of the aqueous solution is 400–450 mm, and the thickness of the corresponding extraction solution layer is 250–350 mm, so that the ratio of the thicknesses of the extraction and aqueous solution layers, particularly at the discharge end of the settler, is 1:1.5, at highest 1:1.7. When copper extraction is run so that in the mixer the ratio of the volume flows of the solution feed is 1:1, this results in that the linear speed of the extraction solution sets on a level which is 40–80%, generally 50–70% higher than the linear speed of the solution.

SUMMARY OF THE INVENTION

The object of the present method and apparatus is to eliminate some of the drawbacks that remain particularly in large extraction plants, irrespective of the improvements described in the patent application mentioned above. Thus the object has been to develop a method and apparatus which can be used so that even the above described linear speed adjustment of the settler flow is not a hindrance to the development of large extraction plants. The flow speed of the extraction solution can be reduced particularly at the front end of the separation field—which is important from the point of view of the final separation—by combining wide flow field structures to structures retaining the extraction solution in a way that strengthens the extraction solution and dispersion layer towards the front end of the separation tank. It has now been proved in practical experiments that when operating with the method and apparatus according to the present invention, a border flow turbulence is not detected, even when the flow speed of the extraction solution is raised up to 500% higher than the flow speed of a corresponding aqueous solution.

According to the invention, the separation part, i.e. the settler, belonging to the extraction step is made deeper, so that the ratio of the layer thicknesses of the extraction solution and the aqueous solution, particularly at the discharge end of the separation part, may even be of the order 1:4, but is at least 1:2.0. When operating in conditions where the layer thickness of the aqueous solution is essentially larger than the one used in conventional methods, it has been proved that a good result can be achieved without harmful effects of the border flow turbulence, because in the separation part which is deeper than conventional settlers the dispersion layer can be allowed to extend as far as the discharge end of the separation part. The invention is also characterized in that the separation part, the settler, is provided with picket fences in order to achieve an even distribution of the dispersion over the whole transversal surface of the settler. The essential novel features of the invention are apparent from the appended claims.

The use of a deepened settler in a way that is useful for its user also in the form of low entrainment values requires an improved circulation control. It is not sufficient only to make the settler deeper than the regular level, because a faster flowing extraction solution immediately makes the aqueous solution layer—that is located underneath this layer and has a thickness of about 20–50% of the thickness of the whole aqueous solution layer—flow faster than the rest of the aqueous solution layer. Thus the extraction solution in a way draws the border layer along with it, and because small extraction solution drops must, when separating from water, rise through this border layer, the separation becomes more difficult. The major part of said drops that raise the entrainment values proceeds, along with this border layer, through the whole settler and is removed along with the aqueous solution. The facts described here explain the use of low settlers, because so far it has not been possible to make use of a deep separation part owing to an inadequate flow control. In particular, the flow of aqueous solutions near the bottom of the separation part, towards the solution discharge end, has not been even. Eddy currents have, when they have been created, made part of the aqueous solution flow even to a wrong direction in zones of varying widths.

The creation of a controlled aqueous solution layer which proceeds smoothly also in the vertical direction is essential for the method and apparatus according to the present invention. The now developed solution is also connected to the above mentioned arrangement described in the FI patent application 93 5393, whereby it is possible to choose and control the form of dispersion, i.e. to decide which solution is present in continuous form and which solution is present as drops in the continuous solution. Generally it is advantageous to mix into drops that solution which is desired to result in a clearer solution, and which consequently contains less entrainments. Accordingly, in such extraction steps from which the aqueous solution is conducted to a next process step, the aqueous solution is rendered into drops.

In a method and apparatus according to the invention, the stream flows are adjusted to be so large that the water drop dispersion extends over the whole settler, from its front end to the discharge end. It is now found out that in a dispersion of this type, the flow speed is clearly lower than in the extraction solution, because the latter as a heavy dispersion sinks in the aqueous solution, thus forming a dispersion that in the flowing direction rises in a wedge-like form at its bottom surface. The dispersion becomes heavy also because the water drops are packed nearer and nearer to each other when descending, in the dispersion layer, towards the bottom surface thereof. A heavy dispersion must push through the aqueous layer on its path to the final end of the settler, and it successively forms a speed-insulating layer in between the pure layers, i.e. between the extraction solution and the aqueous solution.

The above described maintenance of the dispersion layer requires a deeper settler than the one used conventionally, because the dispersion wedge may at the front end of the settler consist 70–100% and at the final end 15–35% of the solution height of the settler. In this situation, it is easier to create a uniform plug flow in the aqueous solution layer, which is stronger than normally, and thus achieve an improved separation result for the aqueous solution as a result of this uniform and long-standing clarification step.

The mutual separation of the solutions can yet be improved, both as regards capacity and separation, by the following means concerning the deepened separation part, which means affect both the extraction solution, dispersion and aqueous solution layers, both in the transversal and horizontal directions, but so that the uniform flow proceeding in the vertical direction of the aqueous solution is taken care of simultaneously.

BRIEF DESCRIPTION OF THE DRAWINGS

The invention is described in more detail with reference to the appended drawings, where FIG. 3 is a top-view illustration of an advantageous structure of another picket fence of the settler, and FIG. 4 is a schematical illustration of the cross-section of the settler in the longitudinal direction.

DETAILED DESCRIPTION OF THE INVENTION

Figure 1:
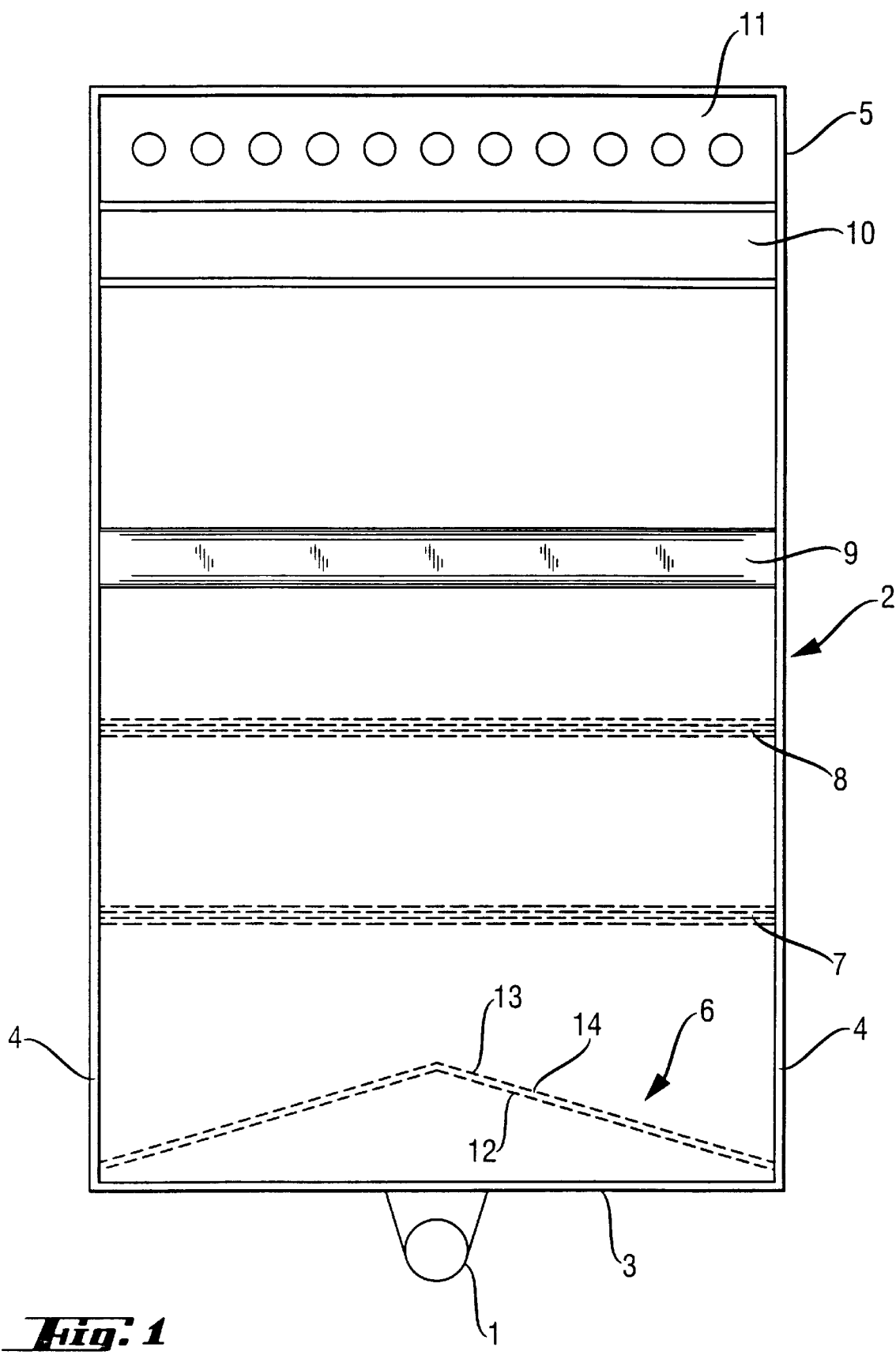
FIG. 1 is a schematical top-view illustration of the settler of the extraction unit.

As is seen in FIG. 1, the dispersion is advantageously brought from the last mixer 1 of the extraction step to a settler 2 and fed in through its front or feeding end 3. The dispersion is fed into the settler at its middle part, seen in the transversal direction, either vertically or by using a partly vertical component, which helps the dispersion turn towards the side walls 4 of the settler. Other essential parts of the settler are a discharge end or solution end 5, various picket fences 6, 7 and 8, an aqueous solution collection channel 9 as well as an extraction solution chute 10 of the solution end and a water end 11.

FIG. 1 further shows that the front end of the settler 1 is provided with a first picket fence, i.e. a primary picket fence 6. The primary picket fence 6 is formed of normal baffle plates 12, and in addition to these it is advantageous to use guide plates 13, which are arranged behind the vertical slots 14 that remain in between the baffle plates 12 when seen in the dispersion flow direction. It is appropriate that this first picket fence causes a pressure loss corresponding to 300–600 Pa in order to achieve an even distribution of the dispersion. The primary picket fence 6 is directed towards the front edges of the settler, as is described in the Finnish patent application 93 5393, in which case the flow channels restricted by the picket fence are narrowed towards the edges 4, so that the distance of the primary picket fence 6 from the front wall 3 of the settler at the edges 4 is still 100–500 mm. In large extraction plants, the width of the slots 14 in the primary picket fence is of the order 15–30 mm, and their number is such that the above described damming is achieved together with the guide plates 13.

Figure 2:
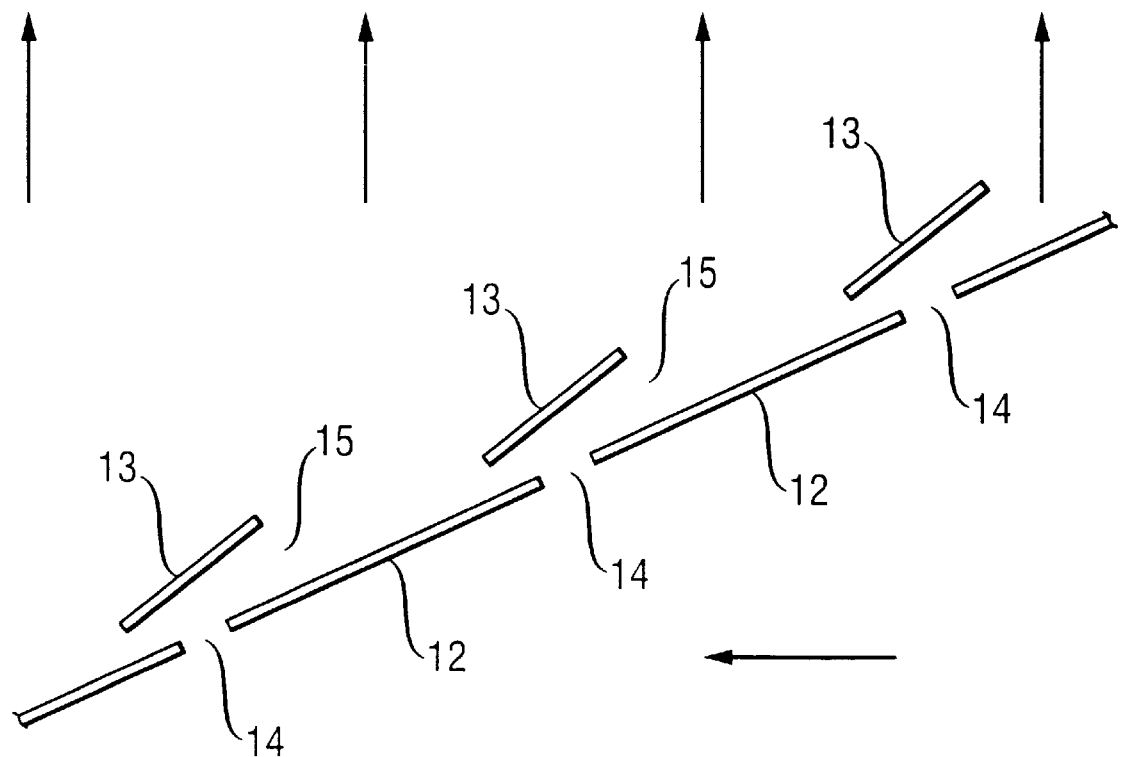
FIG. 2 is a top-view illustration of an advantageous structure of the primary picket fence of the settler.

FIG. 2 shows more accurately how the guide plates 13 are arranged in relation to the baffle plates 12. By means of the guide plates 13, it is possible to eliminate the transversal motion of the dispersion, which is impossible when using a simple picket fence arrangement or some other symmetrical flow structure. According to the invention, the guide plates 13 are turned behind the vertical slots 14, so that there is created a dispersion flow path 15, which is narrower towards the settler walls and wider towards the center, because it is essential that the flow can be turned in the longitudinal direction of the settler. Thus the motional energy is distributed evenly in the transversal direction, and the dispersion is discharged through the slots provided in between the guide plates evenly and in perpendicular direction towards the discharge end of the separation part, i.e. the settler. The baffle plates can also be constructed so that they are narrower than the primary fence proper. It is advantageous that the guide plate in the transversal direction is located symmetrically with respect to the slot 14 left in between the baffle plates. It has been proved that the channels 15 remaining in between the guide plates 13 essentially attenuate the outflow of the dispersion.

According to conventional practice, the feeding end of the settler is, in addition to the primary picket fence, provided with an additional picket fence in order to even out the dispersion feed in the transversal direction. In large units this additional fence, the "picket fence", is usually installed at a distance of 3–7 m from the primary picket fence. The most common structure is a double picket fence, in which case the slots of the fences are arranged in a stepping manner in the transversal direction.

According to the present invention, instead of one additional picket fence there are used at least two separate additional picket fences in order to improve vertical flows in the settler. The distance of the second additional picket fence from the first is of the same order as the distance of the first picket fence from the primary picket fence. It is essential for the method and apparatus that the first additional picket fence does not extend as far as the bottom of the settler, but the latter does. Thus the first additional picket fence, with a bottom clearance of 10–30% of the added thickness of the water layers in the settler, does not dam the already separated aqueous solution, but it can freely flow forwards and thus provide for a bottom current in the right direction.

Both additional picket fences 7 and 8 are advantageously similar in the structure itself, for instance each of them is formed of four individual fences 16, 17, 18 and 19, as is illustrated in FIG. 3. The slots 20 provided in the individual fences are in the next fence always arranged in a shifted position, so that the direct flowing of the liquids through the slots is prevented. When seen in the flowing direction, the slots 21 of the last fence 19 are wider than those provided in the preceding fences, in order to reduce the speed of the phases flowing through the picket fence. The last single fence is formed only of closing strips provided in front of the slots of the preceding fence 18, the width of said strips being only 1.5–3.0 times the width of the slots provided in the rest of the fences.

According to the present invention, the slots in the picket fences, their width and number is so designed, that the damming effect created by the fences rises to the order of 250–500 Pa. This also concerns the first additional picket fence 7, through which flows a larger volume of unseparated dispersion. Because the flow resistance of a dispersion is higher than that of already separated solutions, the damming effect of the additional picket fences can be maintained on a mutually equal level by lifting the first additional picket fence 7 up from the settler bottom. In practice it has been found out that the damming effect of the first additional picket fence is adjusted to be suitable exactly when using a bottom clearance of the volume described above.

FIG. 4 is a schematical illustration of the settler flows and shows how at first the whole flow is in dispersion 22, and how it in the settler is separated into two phases, an organic phase 23 and an aqueous solution phase 24, so that in relation to the pure phases, only a thin layer of dispersion remains in between the settled layers. In FIG. 4 it is seen that the settler is, in a manner described above, designed to be deeper than normally, so that when seen in the flowing direction, at the discharge end of the settler the ratio of the solution layers is clearly larger than in a conventional settler. Likewise it is seen that a thin dispersion layer is made to proceed as far as the discharge end of the settler, in which case the dispersion layer serves as a layer preventing border flow turbulence in between pure phases.

FIG. 4 also illustrates how the additional picket fences in particular affect the settling of the solutions. In between the additional picket fences, there is created a fairly strong layer of a separable dispersion. The latter additional picket fence retains the dispersion flow, which cannot proceed to the discharge end of the settler without an essential flow resistance. Because the first additional picket fence 7 does not extend as far as the bottom 25, it allows a small part of the dispersion to flow through the bottom clearing 26, while the major part flows through the picket fence. Owing to the combined effect of these, there is created a situation where in between the additional picket fences there is a layer of aqueous solution, with a thickness 0.2–0.4 times the whole liquid depth of the separation part. This layer is made to flow in a uniform flow towards the latter additional picket fence, through it and further, in a flow strengthening the bottom flows, through the rest of the settler.

By employing the above described arrangement, a strong dispersion layer is made to gather in between the additional picket fences, and a fairly thin water layer is obtained against the bottom, which successfully enhances the creation of a desired flow. The water pushing out of the dispersion layer as a consequence of the separation, the flow direction whereof is diagonally down and forward, further strengthens the bottom flow started by the first additional picket fence 7 and improves the smoothness of the flow also at the final end of the separation part.

According to the present invention, in the front end of the separation part the dispersion is kept in a compressed state, as a thick layer on both sides of the primary picket fence 6, as well as between the additional picket fences 7 and 8. This increases the capacity of the separation part, because the separating solution quantity grows per area unit along with the growth of the strength of the dispersion layer. Moreover, the degree of separation of the solutions is improved, i.e the entrainment values of the solutions are improved. This again is due to the fact that according to the present arrangement, the dispersion layer is so dominant at the front end of the settler. The solutions must flow through the dispersion layer, or in a dense drop formation in the dispersion state, in which case also small drops are made to collide with larger drops and thus separate into their own solution layer. For instance in copper extraction, this phenomenon has an important significance from the point of view of production. The entering of difficult impurities, such as chlorides and manganeses in the case of copper extraction, to the produced copper solution, i.e. the electrolyte, is prevented, which is necessary in order to produce cathode copper without disturbances for instance according to the electrowinning principle.

From the point of view of phase separation, it would be advantageous to use more than two additional picket fences. With a normal primary picket fence and additional picket fence arrangement, separation space remains in the settler for about 40–50%, even after the last picket fence. It would be more useful to have several additional picket fences with a few meters' interval in between, although the gained effect is respectively reduced as the number of picket fences increases. Because a remarkable effect is gained even with two additional picket fences, it is not recommendable to use more picket fences, particularly in situations where cruds occur, together with a respective need for cleaning. Even the use of two additional picket fences requires that cruds are not formed on a large scale. The mixing technique described in the FI patent application 93 5393 and used in the mixer part prevents the formation of cruds, even if a certain amount of solids should be present for instance in the feed solution of copper extraction.

In the above specification, we have described the method and apparatus according to the invention mainly with reference to copper extraction, where large extraction plants are generally employed, and attempted to find solutions to problems arising there. It is, however, obvious that the method and apparatus can be used in other extraction plants, too.

What is claimed is:

1. A method for separating liquids of different densities obtained in a liquid-liquid extraction which comprises (a)

introducing a dispersion of said liquids by allowing same to flow into a feeding end of a settler; (b) adjusting the flow speed of the lighter liquid through a settler so that it is greater than that of the heavier liquid; (c) preventing flow turbulence at the border of the two liquids caused by said differing flow speeds by providing a heavier liquid drop dispersion layer between the two liquids extending along said border of said liquids until a discharge point of said settler; (d) passing said dispersion of liquids and settled liquids through at least three picket fences each of which forms a restricted transverse surface; (e) turning liquid flow at the first picket fence in a longitudinal direction of the settler; (f) allowing settled heavier liquid to flow freely in the bottom of the settler at the next picket fence; and (g) recovering separated liquid.

2. A method according to claim 1, wherein the liquid-liquid extraction is copper extraction.

3. An extraction settler apparatus for separating two liquids of different densities by gravity comprising a feed end, side walls, a discharge end, a bottom, at least three picket fences located at a front end of the settler apparatus and extending over the whole transverse surface of the settler, liquid flowing from the feed end to the discharge end, a first picket fence in the liquid flow direction comprising baffle plates and apertures with guide plates located behind said apertures, said guide plates being turned so as to form a channel, said channel narrowing towards the walls of the settler and widening towards the middle, and between said first picket fence and the next picket fence in the liquid flow direction there is a clearance at the bottom which is 10 to 30% of the total height of the liquids in the settler.

4. An extraction settler according to claim 3, wherein said first picket fence causes a pressure loss of from 300 to 600 Pa.

5. An extraction settler according to claim 3, wherein said second and third picket fences cause a pressure loss of 250 to 500 Pa.

\* \* \* \* \*